United States Patent [19]

Kubo et al.

[11] Patent Number: 4,954,576
[45] Date of Patent: Sep. 4, 1990

[54] PROCESS FOR HYDROGENATING CONJUGATED DIENE POLYMERS

[75] Inventors: Yoichiro Kubo, Yokohama; Kiyomori Ohura, Kamakura, both of Japan

[73] Assignee: Nippon Zeon Co., Ltd., Tokyo, Japan

[21] Appl. No.: 313,489

[22] Filed: Feb. 22, 1989

[30] Foreign Application Priority Data

Feb. 22, 1988 [JP] Japan .................................. 63-39306

[51] Int. Cl.$^5$ ............................................... C08F 8/04
[52] U.S. Cl. .................................. 525/339; 525/329.3; 525/332.8; 525/332.9; 525/333.1; 525/333.2; 525/338
[58] Field of Search ............................... 525/338, 339

[56] References Cited

U.S. PATENT DOCUMENTS 4,690,983  9/1987  Veazey et al. ..................... 525/339

*Primary Examiner*—Bernard Lipman
*Attorney, Agent, or Firm*—Sherman and Shalloway

[57] ABSTRACT

A process for hydrogenating a conjugated diene polymer which comprises hydrogenating the carbon-carbon double bond of the conjugated diene polymer using a hydrogenation catalyst supported on a carrier, the carrier being an oxide of an element of Group IVa of the periodic table such as $TiO_2$ or $ZrO_2$.

15 Claims, No Drawings

PROCESS FOR HYDROGENATING CONJUGATED DIENE POLYMERS

This invention relates to a process for hydrogenating conjugated diene polymers. More specifically, this invention relates to a process for hydrogenating the carbon-carbon double bond of the conjugated diene polymer using a hydrogenation catalyst supported on an oxide of an element of Group IVa of the periodic table.

Various metals or non-metals are known as catalysts for hydrogenation reaction. Generally, metals of Groups VIII of the periodic table are used, and typical examples include iron, cobalt, nickel, ruthenium, rhodium, palladium, osmium, iridium and platinum. Noble metals are particularly finding widespread use. However, resources for them are scarce and these metals are expensive. In many cases, it is the practice to use them on porous carriers such as carbon, alumina, silica, silicaalumina and diatomaceous earth.

When these supported catalysts are used in the hydrogenation of high-molecular-weight polymers, the polymer may adhere to the surface of the carrier or remain in the pores after the reaction, and sometimes, the catalyst residue or the subsidiary materials used in the polymerization adhere to the carrier. Accordingly, the catalyst once used in the hydrogenation reaction generally decreases drastically in activity unlike the case of hydrogenating low-molecular-weight compounds. For example, a fresh catalyst prepared by using silica having a specific surface structure as a carrier shows high hydrogenating activity (U.S. Pat. No. 4,452,951) But when it is used again, it shows only drastically reduced activity.

Accordingly, when the catalyst is to be re-used, it is frequently necessary to remove the polymer adhering to the catalyst surface or to the pores, the catalyst residue and the subsidiary materials used in the polymerization by thoroughly washing the polymer, or to recover only the catalytic metal and prepare a catalyst again from it.

It is important both from the viewpoint of resources and an industrial process to find a supported catalyst system which can be re-used with good efficiency.

It is an object of this invention to provide a process for producing a hydrogenated conjugated diene polymer, using a supported catalyst which is easy to separate from the reaction system, has high activity and can be re-used.

According to this invention, there is provided a process for hydrogenating a conjugated diene polymer which comprises hydrogenating the carbon-carbon double bond of the conjugated diene polymer in the presence of a hydrogenation catalyst supported on a carrier, the carrier for the catalyst being an oxide of an element of Group IVa of the periodic table.

The oxide of an element of Group IVa of the periodic table used as a carrier in this invention preferably has a particle diameter of 0.01 to 5 mm from the standpoint of hydrogenation activity and the ease of separating the supported catalyst after the hydrogenation reaction. If it has a particle diameter of less than 0.01 mm, the separation of the supported catalyst from the hydrogenated polymer solution as obtained becomes difficult. On the other hand, if the particle diameter exceeds 5 mm, the catalyst can be separated very easily, but the activity of the catalyst, undesirably decreases greatly. $TiO_2$ and $ZrO_2$ are especially preferred as the carrier.

The hydrogenation catalyst used in this invention may be any metal or non-metal catalyst having hydrogenation activity. Specific examples are Fe, Co, Ni, Ru, Rh, Pd, Ir, Os, Pt, Cr, Te, Mn, Ti, V, Zr, Mo and W. They may be used eigher singly or in combination.

Combinations of Pd with metal or non-metal of Groups Ia, IIa, IIIa, IIIb, IVa, IVb, Va, VIa and VIIa of the periodic table, or with Ag, Au, Sb or Te (U.S. Pat. No. 4,337,329) are also preferred because of their high activity. Pd-containing catalysts are especially preferred in view of the hydrogenation efficiency and selectivity.

The method of supporting the catalyst metal or non-metal on the oxide carrier may be in accordance with the method of preparing ordinary carrier-supported catalysts. For example, the supported catalyst is obtained by depositing the catalyst metal or non-metal as an element on the oxide carrier, or by impregnating the oxide carrier in an aqueous solution of a salt of such an element, and then reducing the salt.

The amount of the catalyst metal or non-metal deposited on the carrier is usually 0.001 to 30% by weight, preferably 0.01 to 10% by weight, based on the carrier.

The amount of the catalyst may be properly determined according to the type of the polymer to be hydrogenated, and the intended hydrogenation ratio. The amount of the catalyst metal or non-metal used is usually 5 to 10,000 ppm, preferably 10 to 5,000 ppm, relative to the (co)polymer. It may be used in an amount of more than 10,000 ppm, but this amount is not economical.

The conjugated diene polymer used in this invention is a polymer derived from 10 to 100% by weight of at least one conjugated diene monomer such as 1,3-butadiene, 2,3-dimethylbutadiene, isoprene and 1,3-pentadiene and 90 to 0% by weight of an ethylenically unsaturated monomer copolymerizable with it. Examples of the copolymerizable ethylenically unsaturated monomers include unsaturated nitriles such as acrylonitrile and methacrylonitrile; monovinylidene aromatic hydrocarbons such as styrene, and alkylstyrenes (o- m- and p-methylstyrene and ethylstyrene); unsaturated carboxylic acids such as acrylic acid, methacrylic acid, crotonic acid, itaconic acid and maleic acid; unsaturated carboxylic acid esters such as methyl acrylate, ethyl acrylate, butyl acrylate, 2-ethylhexyl acrylate, and methyl methacrylate; halogenated esters of unsaturated carboxylic acids such as trifluoroethyl acrylate and trifluoroethyl methacrylate; vinylpyridine; and vinyl esters such as vinyl acetate. These polymers are produced by solution polymerization, emulsion polymerization, etc. Typical examples of the conjugated diene polymer are polybutadiene, polyisoprene, butadiene/styrene (random or block) copolymer and acrylonitrile/butadiene (random or alternate) copolymer. The acrylonitrile/butadiene copolymers are especially suitable for hydrogenation of the carbon-carbon double bond by the process of this invention. These copolymers can be highly hydrogenated without reducing the nitrile group.

When a polymer obtained by solution polymerization is to be hydrogenated, the polymer solution as obtained by the copolymerization may be directly subjected to the hydrogenation. When a solid polymer is used, it is dissolved in a solvent, and the solution is subjected to the hydrogenation. The concentration of the polymer solution is usually 1 to 70% by weight, preferably 1 to 40% by weight. The solvent is one which preferably dissolves the polymer, and may be selected according to the type of the polymer. Examples include benzene, toluene, xylene, hexane, cyclohexane, cyclohexanone, acetone, methyl ethyl ketone, diethyl ketone, tetrahydrofuran and ethyl acetate.

The hydrogenation temperature is 0° to 300° C., preferably 20° to 150° C. Temperatures exceeding 150° C. may be used, but are not desirable to selective hydrogenation because side-reactions tend to occur. For example, the solvent is hydrogenated, or the ethylenically unsaturated monomer units in the polymer, for example, the nitrile group of acrylonitrile or the benzene ring of styrene, may undergo hydrogenation.

The hydrogen pressure is atmospheric pressure to 300 $kg/cm^2$, preferably 5 to 200 $kg/cm^2$. High pressures exceeding 300 $kg/cm^2$ may be used, but are not desirable for practical application because, for example, the expenditures for facilities become high and the handling of the reaction system becomes troublesome.

After the hydrogenation reaction, the supported catalyst is separated from the reaction solution by such an operation as filtration, centrifugal separation, or precipitation. The supported catalyst so separated may be directly used again in the hydrogenation reaction. It activity is substantially the same as that of a fresh supported catalyst.

Separation of the hydrogenated polymer from the reaction solution may be effected by methods usually employed for recovering a polymer from a polymer solution, for example by a steam stripping method involving direct contact of the polymer solution with steam, a drum drying method involving dropping the polymer solution onto a hot rotating drum and thereby evaporating the solvent, or a method which comprises adding a poorsolvent to the polymer solution to precipitate the polymer. The hydrogenated polymer is separated by such a separating method, and dried by such a drying step as draining, hot air drying, vacuum drying or extrusion drying. The hydrogenated polymer is thus recovered as a solid.

The resulting hydrogenated conjugated diene polymer can be used in a wide range of applications because of its excellent weatherability, ozone resistance, thermal resistance and low temperature properties.

The following Examples illustrate the present invention specifically. It should be understood that the invention is not limited to the following examples unless it departs from the scope and spirit of the invention.

The hydrogenation ratio of the carbon-carbon double bond was measured by the iodine number method.

COMPARATIVE EXAMPLE $SiO_2$ (specific surface area 400 $m^2/g$; average pore diameter 100 Å; average particle diameter 0.15 mm) was immersed in an aqueous solution of $PdCl_2$ and dried to prepare a catalyst having 1% by weight of Pd supported on it (catalyst No. 1). To examine the activity of this catalyst, 45 g of acetone and 5 g of an acrylonitrile/butadiene copolymer (NBR for short; bound acrylonitrile content 39.4% by weight; $ML_{1+4,100°C}=53$) were fed into a 100 ml. autoclave, and 0.5 g (10 parts by weight per 100 parts by weight of the polymer) of catalyst No. 1 was added. The inside of the autoclave was purged with nitrogen, and then the reaction was carried out at 50° C. under a hydrogen pressure of 50 $kg/cm^2$ for 6 hours. The result is shown in the column of "Fresh catalyst" in Table 1.

Separately, 5 g of each of polybutadiene (BR for short; cis-1,4-content 98% by weight; $ML_{1+4,100°C}=40$), polyisoprene (IR for short; cis-1,4-content 98% by weight; $ML_{1+4,100°C}=80$) and a styrene/butadiene copolymer (SBR for short; styrene content 23.5% by weight; $ML_{1+4,100°C}=50$) was dissolved in 45 g of cyclohexane. The solution was fed into an autoclave, and 1 g (20 parts by weight per 100 parts by weight of the polymer) of catalyst No. 1 was introduced into the autoclave. The inside of the autoclave was purged with nitrogen, and then, the reaction was carried out at 90° C. under a hydrogen pressure of 60 $kg/cm^2$ for 6 hours. The results are shown in the column "Fresh catalyst" in Table 1.

After the above reactions, the supported catalysts were each separated by filtration from the reaction solutions. The above reactions were repeated using the separated catalysts. The results are shown in the column "Re-used catalyst" in Table 1.

EXAMPLE 1

$TiO_2$ (specific surface area 60 $m^2/g$; average particle diameter 0.15 mm) as a carrier was immersed in an aqueous solution of $PdCl_2$ and dried to prepare a catalyst having 1% by weight of Pd supported on it (catalyst No. 2).

To examine the activity of this catalyst, 45 g of acetone and 5 g of NBR (bound acrylonitrile content 9.4% by weight; $ML_{1+4,100°C}=53$) were fed into a 100 ml autoclave, and 0.5 g (10 parts by weight per 100 parts by weight of the polymer) of catalyst No. 2 was introduced into the autoclave. After the inside of the autoclave was purged with nitrogen, the reaction was carried out at 50° C. under a hydrogen pressure of 50 $kg/cm^2$ for 6 hours.

Separately, BR, IR or SBR was reacted under the same conditions as in Comparative Examples.

The results are shown in the column "Fresh catalyst" in Table 1.

After the above reactions, the supported catalysts were each separated by filtration from the reaction solutions. The above reactions were repeated using the separated catalysts. The results are shown in the column "Re-used catalyst" in Table 1.

TABLE 1

|  | Comparative Example | | Example 1 | |
|---|---|---|---|---|
|  | Catalyst No. | | | |
|  | 1 | | 2 | |
|  | Carrier | | | |
|  | $SiO_2$ | | $TiO_2$ | |
|  | Catalyst metal | | | |
|  | Pd | | Pd | |
|  | Fresh catalyst | Re-used Catalyst | Fresh catalyst | Re-used catalyst |
| Hydrogenation activity | | | | |
| NBR | | | | |
| Amount of the catalyst (g/100 g | 10 | 10 | 10 | 10 |

TABLE 1-continued

| | Comparative Example | | Example 1 | |
|---|---|---|---|---|
| Catalyst No. | 1 | | 2 | |
| Carrier | SiO$_2$ | | TiO$_2$ | |
| Catalyst metal | Pd | | Pd | |
| | Fresh catalyst | Re-used Catalyst | Fresh catalyst | Re-used catalyst |
| of the polymer) | | | | |
| Hydrogenation ratio (%) | 98.8 | 33.2 | 96.8 | 96.0 |
| BR | | | | |
| Amount of the catalyst (g/100 g of the polymer) | 20 | 20 | 20 | 20 |
| Hydrogenation ratio (%) | 89.8 | 31.6 | 88.1 | 86.9 |
| IR | | | | |
| Amount of the catalyst (g/100 g of the polymer) | 20 | 20 | 20 | 20 |
| Hydrogenation ratio (%) | 55.3 | 17.5 | 62.3 | 60.9 |
| SBR | | | | |
| Amount of the catalyst (g/100 g of the polymer) | 20 | 20 | 20 | 20 |
| Hydrogenation ratio (%) | 74.2 | 24.8 | 70.9 | 69.6 |

EXAMPLE 2

ZrO$_2$ (specific surface area 80 m$^2$/g, average particle diameter 0.2 mm) as a carrier was immersed in an aqueous solution of PdCl$_2$ and dried to prepare a catalyst having 1% by weight of Pd supported on it (catalyst No. 3).

To examine the activity of this catalyst, NBR was reacted under the same conditions as in Comparative Example. The result is shown in the column "Fresh catalyst" in Table 2.

After the reaction, the catalyst was separated from the reaction solution by filtration, and the above reaction was repeated using the separated catalyst. The result is shown in the column "Re-used catalyst" in Table 2.

EXAMPLE 3

ZrO$_2$ (specific surface area 80 m$^2$/g; average particle diameter 0.2 mm) as a carrier was immersed in an aqueous solution of RhCl$_2$ and dried to prepare a catalyst having 1% by weight of Rh supported on it (catalyst No. 4).

To examine the activity of this catalyst, 100 parts by weight of NBR and 20 parts by weight of catalyst No. 4 were fed into an autoclave. The inside of the autoclave was purged with nitrogen, and then the reaction was carried out at 50° C. under a hydrogen pressure of 50 kg/cm$^2$ for 6 hours. The result is shown in the columnn "Fresh catalyst" in Table 2.

After the reaction, the catalyst was separated from the reaction solution by filtration, and the above reaction was repeated using the separated catalyst. The result is shown in the column "Re-used catalyst" in Table 2.

TABLE 2

| | Example 2 | | Example 3 | |
|---|---|---|---|---|
| Catalyst No. | 3 | | 4 | |
| Carrier | ZrO$_2$ | | ZrO$_2$ | |
| Catalyst metal | Pd | | Rh | |
| | Fresh catalyst | Re-used Catalyst | Fresh Catalyst | Re-used catalyst |
| Hydrogenation activity | | | | |
| NBR | | | | |
| Amount of the catalysed used (g/100 g of the polymer) | 10 | 10 | 20 | 20 |
| Hydrogenation ratio (%) | 95.3 | 90.8 | 93.9 | 92.8 |

The results given in Tables 1 and 2 clearly show that when silica was used as a carrier, the hydrogenation activity of the catalyst in the first reaction (fresh catalyst) was high, but abruptly decreased in the second reaction (re-used catalyst), whereas when TiO$_2$ or ZrO$_2$ was used in accordance with this invention, the decrease of the hydrogenation activity was scarcely observed in the second reaction. Accordingly, the supported catalyst of this invention can be repeatedly used.

We claim:

1. A process for hydrogenating a conjugated diene polymer derived from 10 to 100% by weight of at least one conjugated diene monomer selected from the group consisting of 1,3-butadiene, 2,3-dimethylbutadiene, isoprene and 1,3-pentadiene and 90 to 0% by weight of an ethylenically unsaturated monomer copolymerizable with said at least one conjugated diene which comprises hydrogenating the carbon-carbon double bond of the conjugated diene polymer in the presence of a hydrogenation catalyst supported on a carrier, the carrier being an oxide of an element of Group IVa of the periodic table.

2. The process of claim 1 in which the carrier is TiO$_2$ or ZrO$_2$.

3. The process of claim 1 in which the hydrogenation catalyst is Pd or Rh.

4. The process of claim 1 in which the carrier is $TiO_2$.

5. The process of claim 1 in which the carrier $ZrO_2$.

6. The process of claim 1 wherein said ethylenically unsaturated monomer comprises an unsaturated nitrile.

7. The process of claim 1 wherein the conjugated diene polymer is selected from the group consisting of polybutadiene, polyisoprene, butadiene/styrene copolymer and acrylonitrile/butadiene copolymer.

8. The process of claim 1 wherein the step of hydrogenating is carried out in a solution of the polymer in a solvent in which said polymer is soluble and at a temperature of from about 20° to 150° C. and a pressure of from 5 to 200 kg/cm².

9. The process of claim 1 wherein said hydrogenation catalyst is supported on said carrier in an amount of from about 0.01 to 10% by weight, based on the carrier and is used in an amount of 10 to 5,000 ppm, relative to the conjugated diene polymer.

10. The process of claim 1 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

11. The process of claim 3 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

12. The process of claim 4 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

13. The process of claim 5 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

14. The process of claim 6 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

15. The process of claim 7 which further comprises separating and recovering the supported hydrogenation catalyst from the hydrogenated polymer and reusing the recovered catalyst for hydrogenation of additional conjugated diene monomer, said recovered supported catalyst having substantially the same activity as the fresh supported catalyst.

* * * * *